United States Patent
Kunda et al.

(10) Patent No.: US 7,770,949 B2
(45) Date of Patent: Aug. 10, 2010

(54) REDUCED DOOR OPENING FORCE AND ENHANCED SECURITY FLIGHT DECK DOOR MECHANISM

(75) Inventors: James J. Kunda, Snohomish, WA (US); Shannon J. Kupfer, Kirkland, WA (US); Michael E. Renzelmann, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/923,238

(22) Filed: Oct. 24, 2007

(65) Prior Publication Data

US 2008/0135684 A1 Jun. 12, 2008

Related U.S. Application Data

(63) Continuation-in-part of application No. 10/963,356, filed on Oct. 12, 2004, now abandoned.

(51) Int. Cl.
*E05B 15/02* (2006.01)
*E05C 1/06* (2006.01)

(52) U.S. Cl. .............. 292/341.16; 292/144; 292/340; 292/341.15

(58) Field of Classification Search ............ 292/144, 292/340, 341.16, 341, 341.15
See application file for complete search history.

(56) References Cited

U.S. PATENT DOCUMENTS

| 425,777 | A | * | 4/1890 | GodPrey | 292/341.16 |
|---|---|---|---|---|---|
| 538,127 | A | * | 4/1895 | Schneider | 292/341.16 |
| 924,126 | A | * | 6/1909 | Armel et al. | 292/173 |
| 1,243,433 | A | * | 10/1917 | Lurie | 292/341.16 |
| 1,251,682 | A | * | 1/1918 | Miller | 292/341.16 |
| 1,618,738 | A | * | 2/1927 | Weiss | 292/341.16 |
| 2,039,433 | A | * | 5/1936 | McNeill | 70/283 |
| 2,553,023 | A | * | 5/1951 | Walters | 49/276 |
| 3,122,388 | A | * | 2/1964 | Powers | 292/341.16 |
| 3,521,921 | A | * | 7/1970 | Miyazaki | 292/201 |
| 4,522,359 | A | * | 6/1985 | Church et al. | 244/129.5 |
| 4,869,536 | A | * | 9/1989 | Kleefeldt | 292/210 |
| 4,986,584 | A | * | 1/1991 | Logas | 292/341.16 |
| 5,064,228 | A | * | 11/1991 | Bisbing | 292/54 |
| 5,219,196 | A | * | 6/1993 | Luker | 292/341.16 |
| 5,934,720 | A | * | 8/1999 | Karalius | 292/341.16 |
| 6,677,844 | B1 | | 1/2004 | Gorospe et al. | |
| 6,902,137 | B2 | * | 6/2005 | Brzeski et al. | 244/129.5 |
| 7,032,863 | B1 | * | 4/2006 | Piorkowski et al. | 244/129.4 |

(Continued)

*Primary Examiner*—Carlos Lugo
(74) *Attorney, Agent, or Firm*—Harness, Dickey & Pierce, P.L.C.

(57) ABSTRACT

An aircraft door mechanism includes a solenoid connected to a support assembly. The solenoid displaces the latch pin between a solenoid energized and a solenoid de-energized position. A catch assembly rotatably connected to the support assembly is positioned to engage a 3½ degree or less taper portion of the latch pin in the solenoid energized position. When the latch pin moves to the solenoid de-energized position, a latch bolt supported by the door rotates the catch assembly. The latch bolt includes a distal bulbous end which multiplies the force applied to the door to rotate the catch assembly. If the latch pin is extended, a substantially greater force is required to force the latch pin to the solenoid de-energized position owing to the reduced taper of the latch pin. Authorized door entry is therefore easier and unauthorized door entry is made more difficult.

21 Claims, 11 Drawing Sheets

U.S. PATENT DOCUMENTS

2002/0092951 A1 7/2002 Haviv
2003/0160130 A1 8/2003 Novak et al.
2004/0046084 A1 3/2004 Brzeski et al.
2004/0061343 A1 4/2004 Bashford
2006/0208501 A1* 9/2006 Harvey et al. ............... 292/201

* cited by examiner

REDUCED DOOR OPENING FORCE AND ENHANCED SECURITY FLIGHT DECK DOOR MECHANISM

CROSS-REFERENCE TO RELATED APPLICATIONS

This application is a continuation-in-part of U.S. patent application Ser. No. 10/963,356 filed on Oct. 12, 2004. The disclosure of the above application is incorporated herein by reference.

FIELD

The present disclosure relates in general to door operating mechanisms and more specifically to an electronically locking cockpit door operating mechanism.

BACKGROUND

Effectively controlling access to the flight deck or cockpit of a passenger aircraft helps to control numerous risks associated with unauthorized cockpit entry. Typically, aircraft personnel have controlled access to the cockpit through an electronic locking mechanism disposed on or in the cockpit door and/or door frame/structure. Electronic locking systems typically involve solenoid systems having an electric solenoid, a control switch within the flight deck and a keypad for entering an access code. The solenoid when powered automatically engages to lock the door upon closing the door and retracts upon an authorized crew member requesting entry to the flight deck, and the pilots granting access to the flight deck via the control switch or by entering an access code with the keypad. In common applications, the solenoid is energized to project a pin which prevents unauthorized door opening. The solenoid is de-energized via the control switch or when the access code is entered which retracts the pin and allows the door to be swung open. A door deadbolt is also commonly available to positively lock the door closed in the event electric power is lost to the solenoid. The solenoid driven latch device, however, provides the normal capability to hold the door closed and locked.

While common electronic systems effectively control access, this must be balanced against the need to easily open the door for an authorized entry. Common solenoid systems therefore provide a taper at the engagement end of the pin which allows a catch assembly of the door strike mechanism to push the pin out of the way so the door can be opened under a rapid decompression event and with the pin in a partly engaged position. The pin taper, however, in combination with the flat faced catch assembly design, can adversely affect the electric door strike assembly's capability to withstand a forced entry.

There is therefore a need to provide a mechanism for aircraft cockpit door use which both permits the door to be opened easily for authorized entry yet provides sufficient retention capability to prevent unauthorized entry into the cockpit.

SUMMARY OF THE INVENTION

According to one embodiment of the present disclosure, an apparatus and method to control door opening force for an enhanced security flight deck door includes a solenoid connected to a support assembly. The solenoid displaces a latch pin between a solenoid energized and a solenoid de-energized position. A catch assembly rotatably connected to the support assembly is positioned to engage a taper portion of the latch pin when the latch pin is in the solenoid energized position. The taper portion has a taper angle ranging from $0° \leq$ taper angle $\leq 3.4°$. When the latch pin moves to the solenoid de-energized position, a latch bolt supported by the door rotates the catch assembly. The latch bolt can include either a distal bulbous end or a sharp edged corner which multiplies the force applied to the door to rotate the catch assembly. If the latch pin is extended, a substantially greater force is required to force the latch pin to the solenoid de-energized position owing to the reduced taper of the latch pin.

According to one embodiment of the present disclosure, a method for controlling a door opening force for an aircraft cockpit door is provided.

According to another embodiment of the present disclosure, an aircraft door latch mechanism includes a latch bolt having a longitudinal axis. The latch bolt is slidably positioned along the longitudinal axis between each of a retracted position and an extended position. The latch bolt also includes a flat engagement surface, a sharp corner at a free end of the latch bolt, and a relief edge proximate the sharp corner. A latch pin includes a taper portion having a taper angle ranging from an angle greater than zero degrees up to approximately 3.0 degrees with respect to a longitudinal axis of the latch pin. The latch pin is positionable in each of a first extended position and a second retracted position. A catch arm is rotatably disposed on a pivot pin and is adapted to engage the taper portion of the latch pin when the latch pin is positioned in the first position. The catch arm further includes a flat face; and a wall having a face extending transverse to the flat face defining a corner between the face and the flat face. In the extended position the engagement surface of the latch bolt is in planar abutment with the flat face of the catch arm, the sharp corner is engaged with the corner of the catch arm, and the relief edge abuts the wall of the catch arm.

An apparatus to reduce door opening force for an enhanced security flight deck door provides several advantages. A bulbous shaped or a sharp cornered end of a latch bolt effectively provides a point of contact along an added flat face of a catch arm which multiplies the force as the catch arm rotates. A flattened face of the catch arm provides a smooth contact surface for the bulbous or sharp corner end as the door opens. A solenoid holds a latch pin in an extended solenoid energized position to normally keep the door in a closed, controlled position. By reducing a degree of taper provided at an end of the latch pin below the commonly used taper of approximately 4 degrees, significantly greater force must be applied to the door to force the catch arm to displace the latch pin. Due to both the addition of the bulbous end or the sharp edged corner on the latch bolt and the addition of the flat face to the catch arm the door is therefore easier to open when the solenoid is de-energized and the latch pin is in the de-energized position. The door is significantly more difficult to force open when the latch pin is in the solenoid energized position due to the decreased latch pin taper angle.

The features, functions, and advantages can be achieved independently in various embodiments of the present invention or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
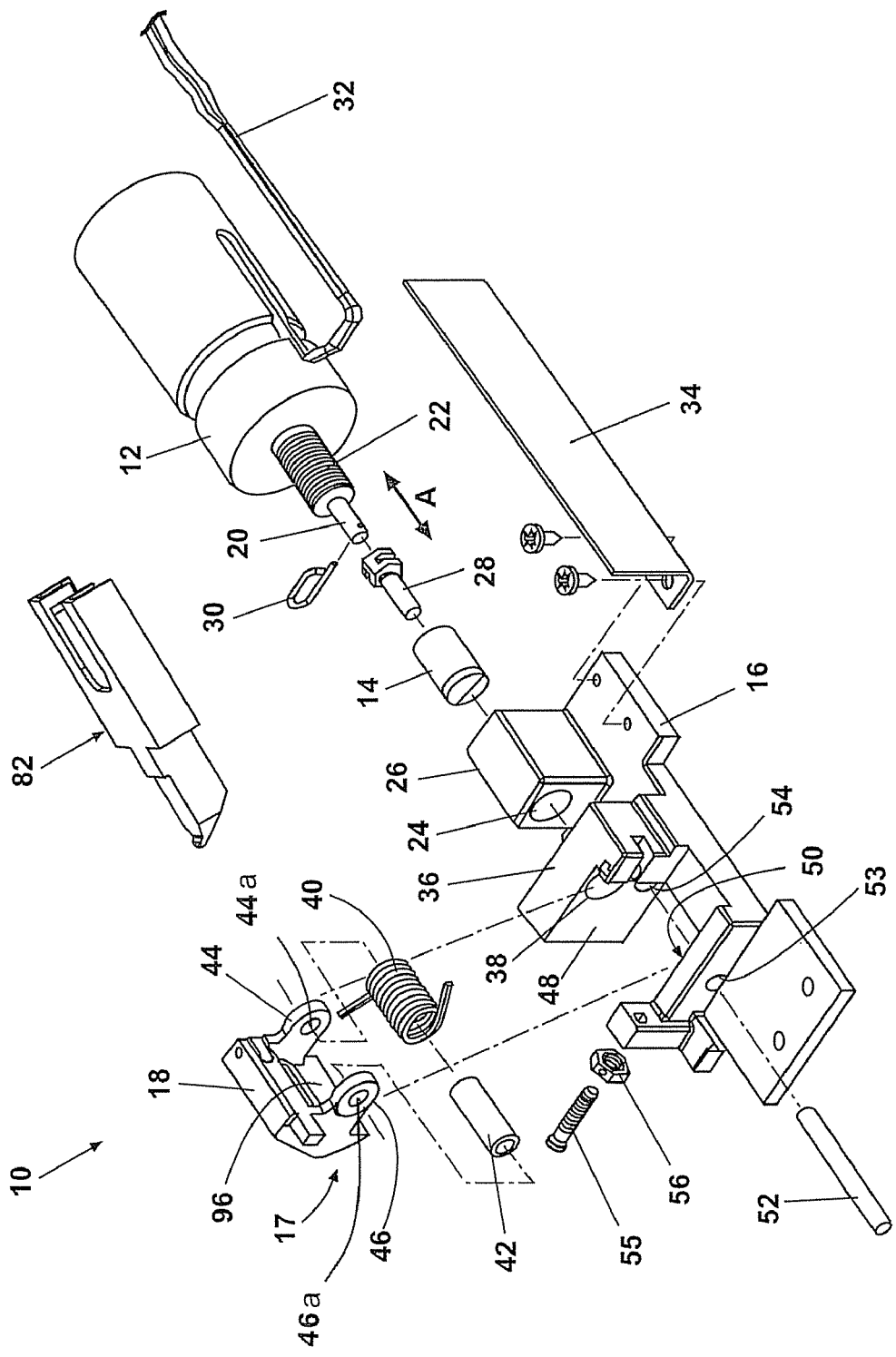
FIG. 1 is an exploded view of a door strike assembly and latch bolt according to a preferred embodiment for a reduced door opening force for an enhanced security flight deck door mechanism of the present invention.

According to a preferred embodiment of the present invention and referring generally to FIG. 1, a door locking mechanism 10 includes a solenoid 12 which is operable to longitudinally displace a latch pin 14. Latch pin 14 is positioned in slidable engagement with a catch support assembly 16 of the present invention. Solenoid 12 positions latch pin 14 in either of pin displacement direction arrows "A". A catch arm assembly 17 is rotatably mounted to catch support assembly 16. Latch pin 14 is operable to prevent rotation of a catch arm 18 of catch arm assembly 17 when latch pin 14 is positioned by solenoid 12 in a solenoid energized position of solenoid 12.

Solenoid 12 further includes a solenoid shaft 20 longitudinally displaceable in the direction of pin displacement direction arrows "A". Solenoid shaft 20 is slidably disposed within a threaded portion 22. Threaded portion 22 of solenoid 12 is threadably engaged within a threaded aperture 24 of a solenoid support member 26 of catch support assembly 16. An adjustment element 28 is slidably disposed over solenoid shaft 20 and retained relative to solenoid shaft 20 using a retention clip 30. Adjustment element 28 is externally threaded to receive internal female threads of latch pin 14.

Solenoid 12 is electrically powered and controlled via a wire bundle 32. A mounting bracket 34 is provided to further support either or both of solenoid 12 and wire bundle 32 to catch support assembly 16.

Catch support assembly 16 further includes a catch/pin connecting member 36 which includes a pin receiving aperture 38 sized to slidably receive latch pin 14. Catch arm assembly 17 further includes a torsion spring 40 which is substantially hollow and internally supported by a torsion spring support tube 42 which is positioned between a first extension 44 and a second extension 46 of catch arm 18. First extension 44 of catch arm 18 has an aperture 44a for receiving rotatably abuts a first contact face 48 of catch/pin connecting member 36. Similarly, second extension 46 of catch arm 18 has an aperture 46a and rotatably abuts a second contact face 50 of catch support assembly 16. A centering sleeve 52 is slidably positioned via a centering sleeve receiving aperture 53 within apertures 44a and 46a of the first extension 44 and second extension 46, respectively, and through torsion spring support tube 42 to rotatably mount catch arm 18 to catch support assembly 16. A distal end of centering sleeve 52 is slidably received within a centering sleeve retention aperture 54 formed within catch/pin connecting member 36. Catch support assembly 16 further includes an adjustment screw 55 fixed in position using a locking nut 56.

Figure 6:
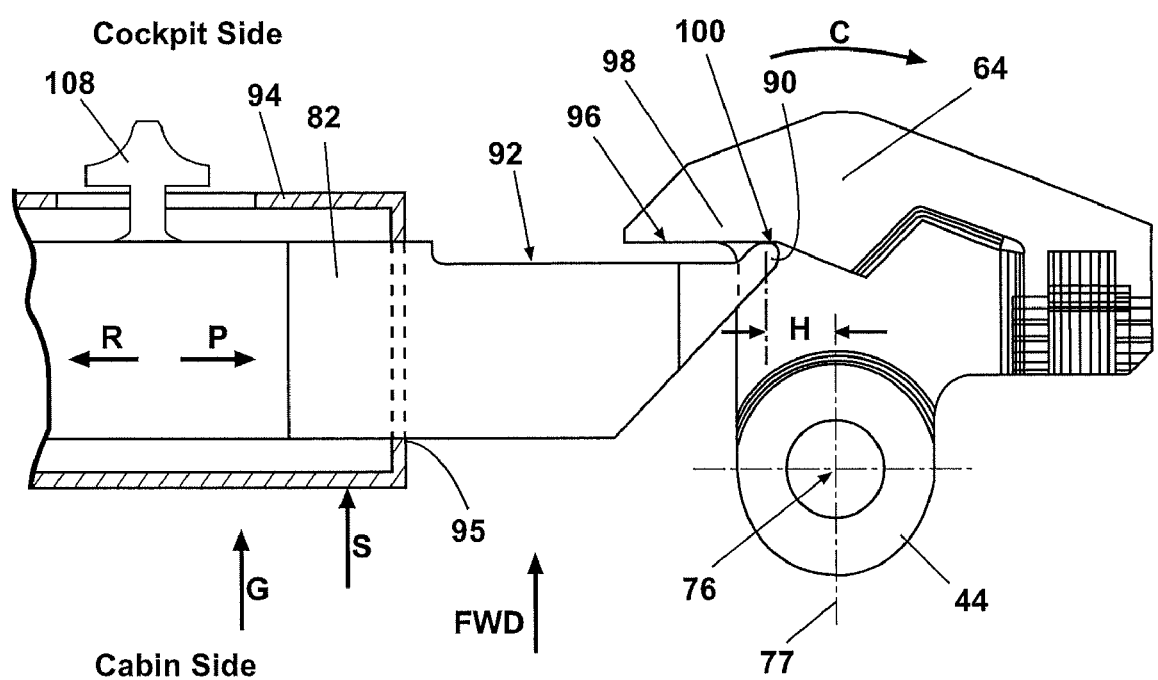
FIG. 6 is a partially sectioned plan view of the latch bolt and flat faced catch arm of the present invention in a door closed position.

Door locking mechanism 10 further includes a latch bolt 82 which is slidably connected to a door such as a cockpit door (shown and described in reference to FIG. 6). Latch bolt 82 contacts a flattened catch face 96 of catch arm 18 to normally maintain a door closed position. As will be discussed further herein, sufficient force applied via latch bolt 82 can also rotate catch arm 18 to open the door.

Figure 2:
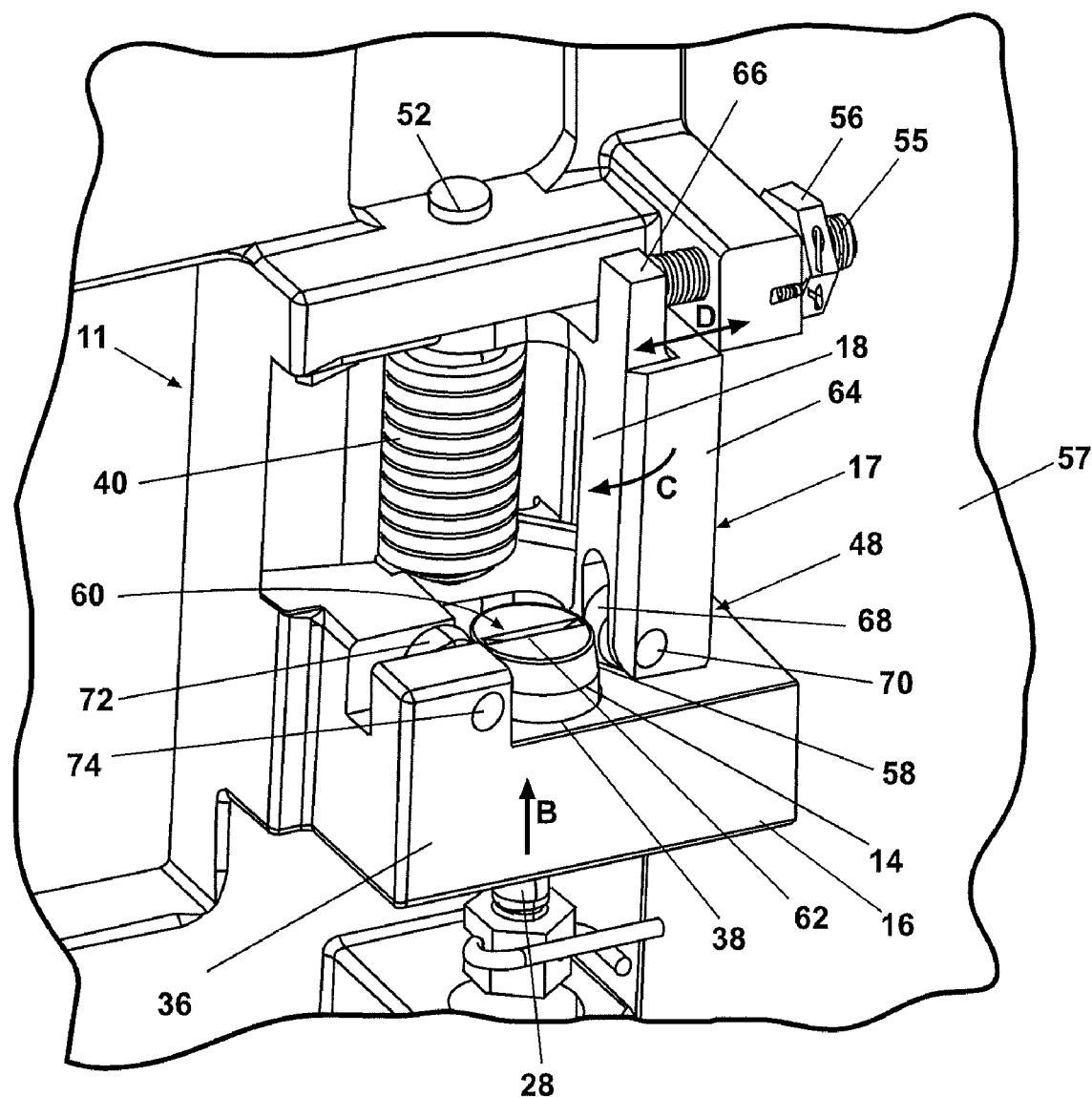
FIG. 2 is a perspective view of a partially assembled door strike assembly of FIG. 1 showing a latch pin in a solenoid energized position.

Referring next to FIG. 2, a portion of door locking mechanism 10 includes a door latch assembly 11. Door latch assembly 11 is connected to a door post/structure 57 and includes latch pin 14, catch support assembly 16 and catch arm assembly 17. Latch pin 14 is shown threaded to adjustment element 28 in the solenoid energized position and fully extended in a pin energized displacement direction "B". Catch support assembly 16 is fastened or otherwise connected to door post/structure 57 of the mobile platform. In a preferred embodiment of the present invention door locking mechanism 10 is used to provide access and access control to a cockpit of an aircraft. To accomplish this, latch pin 14 is provided with a taper portion 58. In the fully extended or solenoid energized position of latch pin 14, taper portion 58 is completely exposed above first contact face 48 of catch/pin connecting member 36. Latch pin 14 is slidably received within pin receiving aperture 38 such that latch pin 14 is horizontally restrained by the aperture wall of pin receiving aperture 38. A distal end 60 of latch pin 14 includes a slot 62 provided to allow a tool such as a screwdriver to be used to rotate to adjust the position of latch pin 14 using male threads of adjustment element 28.

Catch arm assembly 17 further includes a catch arm member 64 which rotates about a catch arm rotation arc "C" starting at the position shown. Catch arm member 64 is restrained at one end of its rotation path by contact between a stop portion 66 of catch arm member 64 and adjustment screw 55. Adjustment screw 55 is threaded into engagement with stop portion 66 to provide a door closed position of catch arm 18 shown in FIG. 2. Adjustment screw 55 is positionable in either of catch arm adjustment direction arrows "D".

In the solenoid energized position shown in FIG. 2, latch pin 14 in its extended position prevents rotation of catch arm member 64 about catch arm rotation arc "C". Rotation is prevented by contact between taper portion 58 of latch pin 14 and a first wheel 68 rotatably mounted to catch arm member 64 using a first pin 70. Horizontal displacement of latch pin 14 is further restrained by contact on an opposing side of taper portion 58 between taper portion 58 and a second wheel 72. Second wheel 72 is rotatably mounted to catch/pin connecting member 36 using a second pin 74. Door locking mechanism 10 normally prevents door opening when the latch pin 14 is positioned as shown in FIG. 2 by physical contact with latch pin 14 and the additional rotational force provided by torsion spring 40.

It is possible, however, to overcome the torsional force provided by torsion spring 40 as well as to force displacement of latch pin 14 in a direction opposite to pin energized displacement direction "B" by applying a sufficient force in the catch arm rotation arc "C". When sufficient force (defined as a force greater than a human applied force) is supplied in the direction of catch arm rotation arc "C", first wheel 68 forces latch pin 14 downward as viewed in FIG. 2 by contact with taper portion 58 sufficient to overcome both the frictional engagement forces of latch pin 14 within pin receiving aperture 38 and the upward directed force provided by solenoid 12. The amount of force required to overcome the position of latch pin 14 shown in FIG. 2 is controlled in part by selectively controlling the amount or degree of taper of taper portion 58.

Figure 3:
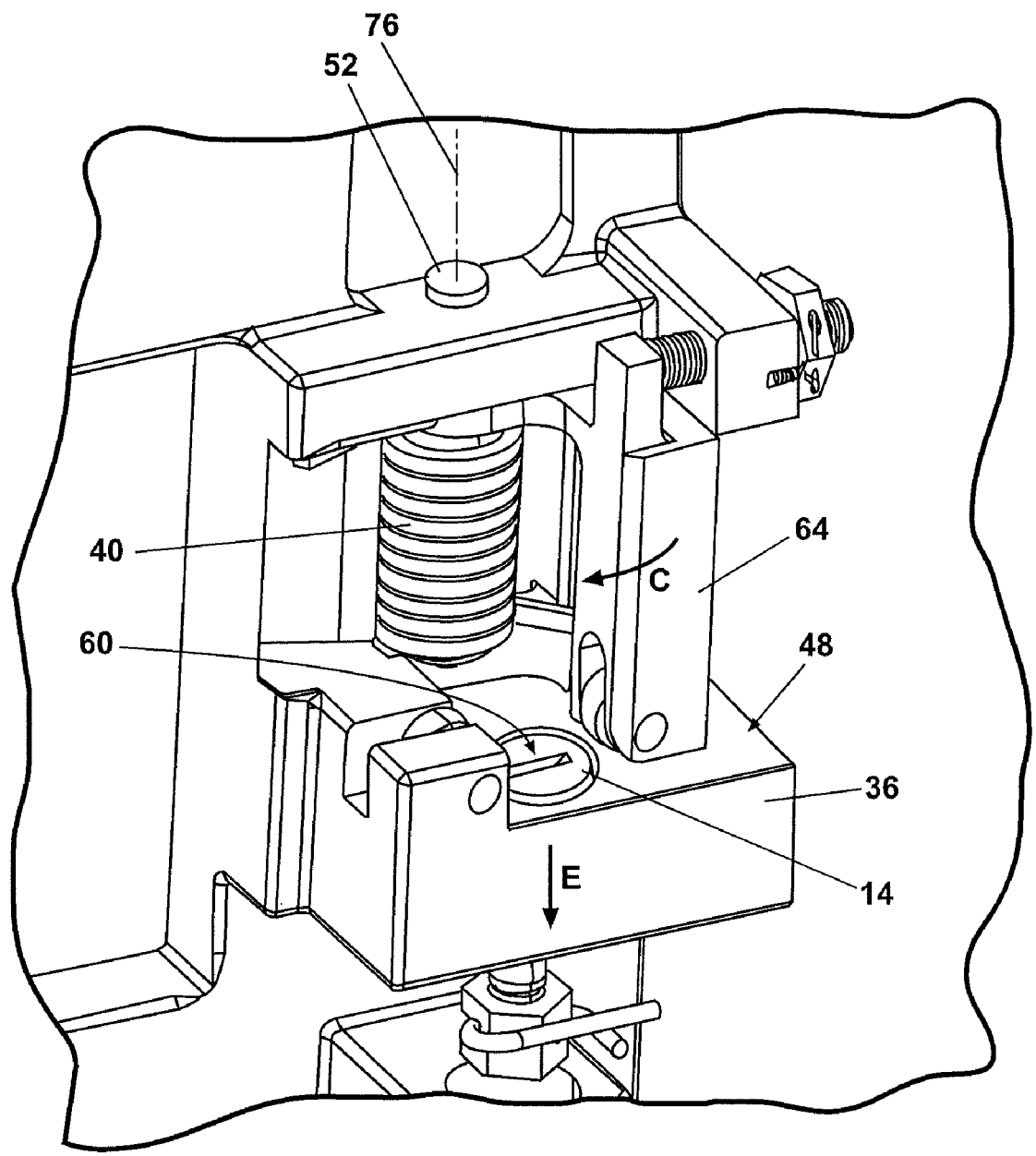
FIG. 3 is a perspective view similar to FIG. 2 showing the latch pin in a solenoid de-energized position.

Referring next to FIG. 3, when solenoid 12 is de-energized, latch pin 14 repositions in a pin de-energized displacement direction "E" to a latch pin de-energized position shown. Latch pin 14 is adjusted relative to adjustment element 28 such that in the de-energized position, distal end 60 of latch pin 14 is substantially co-planar with or below first contact face 48 of catch/pin connecting member 36 as viewed in FIG. 3. In the de-energized position of latch pin 14 shown, catch arm member 64 is therefore free to rotate in the catch arm rotation arc "C" and permit a manual opening of an adjacent door. Catch arm member 64 rotates about a catch arm axis of rotation 76 centrally formed through centering sleeve 52. To reposition catch arm member 64 in the catch arm rotation arc "C", sufficient force is only required to overcome the biasing force provided by torsion spring 40 and any frictional forces.

Figure 4:
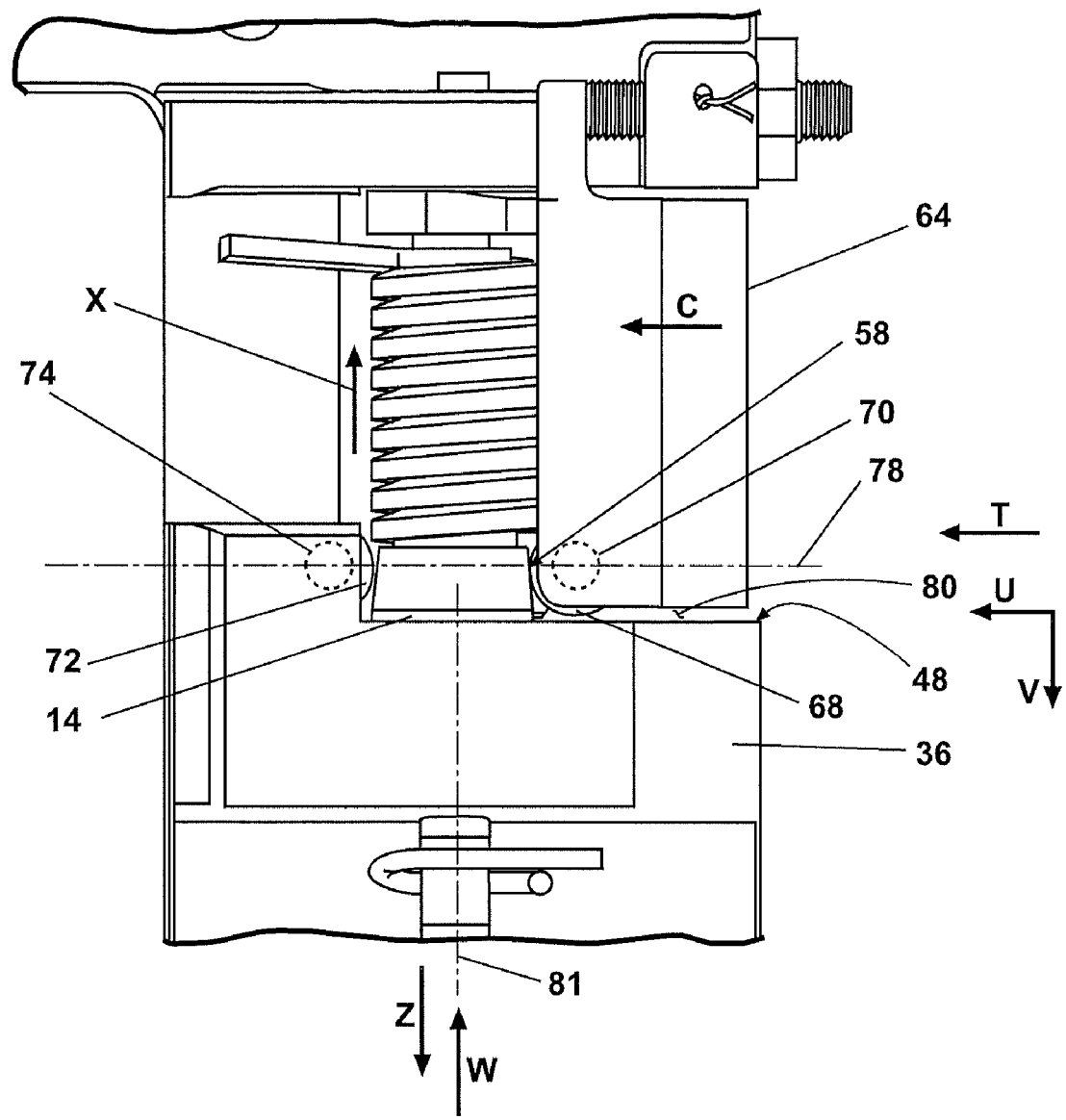
FIG. 4 is an elevational view of the door strike assembly portion of the present invention.

As best seen in reference to FIG. 4, first pin 70 and second pin 74 are co-axially aligned along a pin axis 78. This insures that both first wheel 68 and second wheel 72 contact taper portion 58 of latch pin 14 and not a non-tapered portion of latch pin 14. Contact with a non-tapered portion of latch pin 14 would prevent any longitudinal displacement of latch pin 14. A clearance gap 80 is maintained between catch arm member 64 and first contact face 48 of catch/pin connecting member 36. Clearance gap 80 provides freedom of rotation for catch arm member 64 relative to first contact face 48.

Figure 5:
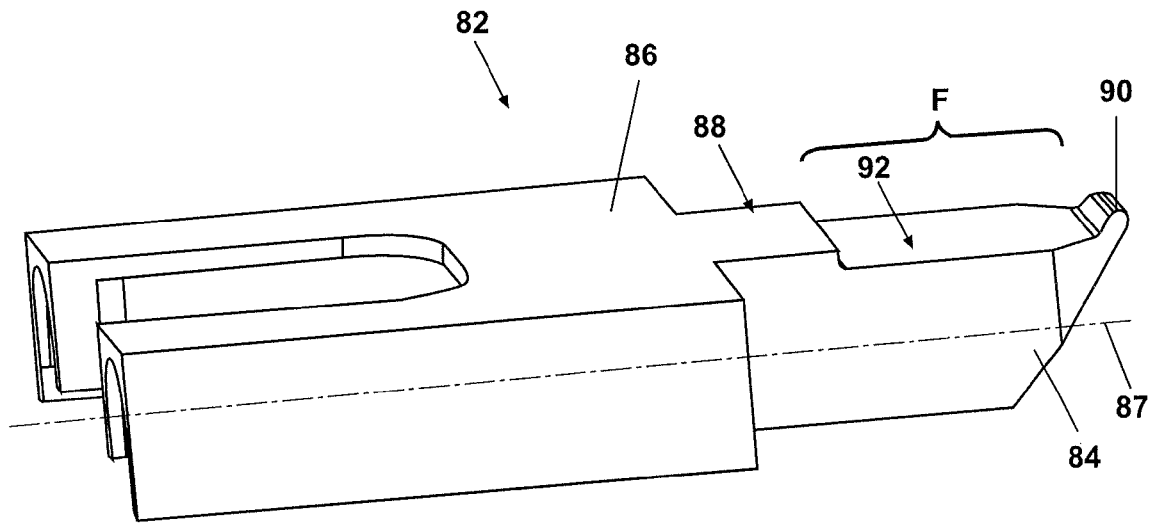
FIG. 5 is a perspective view of a latch bolt according to a preferred embodiment of the present invention.

Referring generally to FIGS. 5 and 6, door locking mechanism 10 further includes the latch bolt 82 positioned in an exemplary embodiment in a cockpit door 94. The latch bolt 82 includes a latch end 84 machined or otherwise created as an extension from a U-shaped body 86. U-shaped body 86 is generally disposed within the door of the aircraft and is permitted to longitudinally displace parallel to a longitudinal axis 87 of latch bolt 82. A material removal area "F" is provided between a surface 88 and a bulbous end 90 of latch bolt 82. Material of latch bolt 82 is removed or otherwise eliminated to form a recessed surface 92 within material removal area "F". Bulbous end 90 is substantially rounded in shape and is positioned at a distal end of latch bolt 82.

Referring more specifically to FIG. 6, in one exemplary embodiment of the present invention latch bolt 82 is slidably disposed within cockpit door 94 and can be displaced in an engagement direction "P" or a release direction "R". Recessed surface 92 and bulbous end 90 generally face a cockpit side of cockpit door 94 when cockpit door 94 is closed as shown. Bulbous end 90 of latch bolt 82 is positioned as shown when cockpit door 94 is in the closed position. Bulbous end 90 contacts a flattened catch face 96 of a catch end 98 of catch arm member 64. A contact point 100 is thereby created between bulbous end 90 and catch face 96. A force "S" applied to cockpit door 94 in a force application direction "G" is transferred at a door contact point 95 to latch bolt 82 and from latch bolt 82 via bulbous end 90 at contact point 100 to catch face 96. The force transferred to catch arm member 64 at contact point 100 can be varied by changing a force displacement distance "H". Force displacement distance "H" is measured from a catch arm axis 77 of first and second extensions 44, 46 (only first extension 44 is shown for clarity). When sufficient force "S" is applied to cockpit door 94 in force application direction "G" rotation of catch arm member 64 is initiated. Rotation of catch arm member 64 is in catch arm rotation arc "C". Rotation of catch arm member 64 is prevented if latch pin 14 is located as shown in FIG. 2 in the solenoid energized position. Rotation of catch arm member 64 is permitted if latch pin 14 is in the solenoid de-energized position shown in FIG. 3.

As previously discussed, and referring to FIGS. 4 and 6, if sufficient opening force "S" is applied in force application direction "G", latch pin 14 can also be displaced from the extended position shown in FIG. 2 even if solenoid 12 is energized. During this event, a total horizontal force "T" applied by catch arm member 64 to taper portion 58 is partially split into a smaller parallel force component "U" and a perpendicular force component "V". When perpendicular force component "V" is sufficient to overcome an oppositely directed energized force "W" of solenoid 12 plus a frictional force "X" between latch pin 14 and the wall of pin receiving aperture 38, (V>(W+X)) latch pin 14 is forced in a pin displacement direction "Z" (downward as viewed in FIG. 4).

Bulbous end 90 of latch bolt 82 permits a point load to be applied to catch face 96. This multiplies the force applied against catch arm member 64 as catch arm 18 rotates and force displacement distance "H" increases. Cockpit door 94 can therefore be opened using less force. By reducing the force required to open cockpit door 94, however, an unauthorized entry via cockpit door 94 could also result if sufficient force "S" is applied to cockpit door 94. For this reason, latch pin 14 is modified as discussed below.

Figure 7:
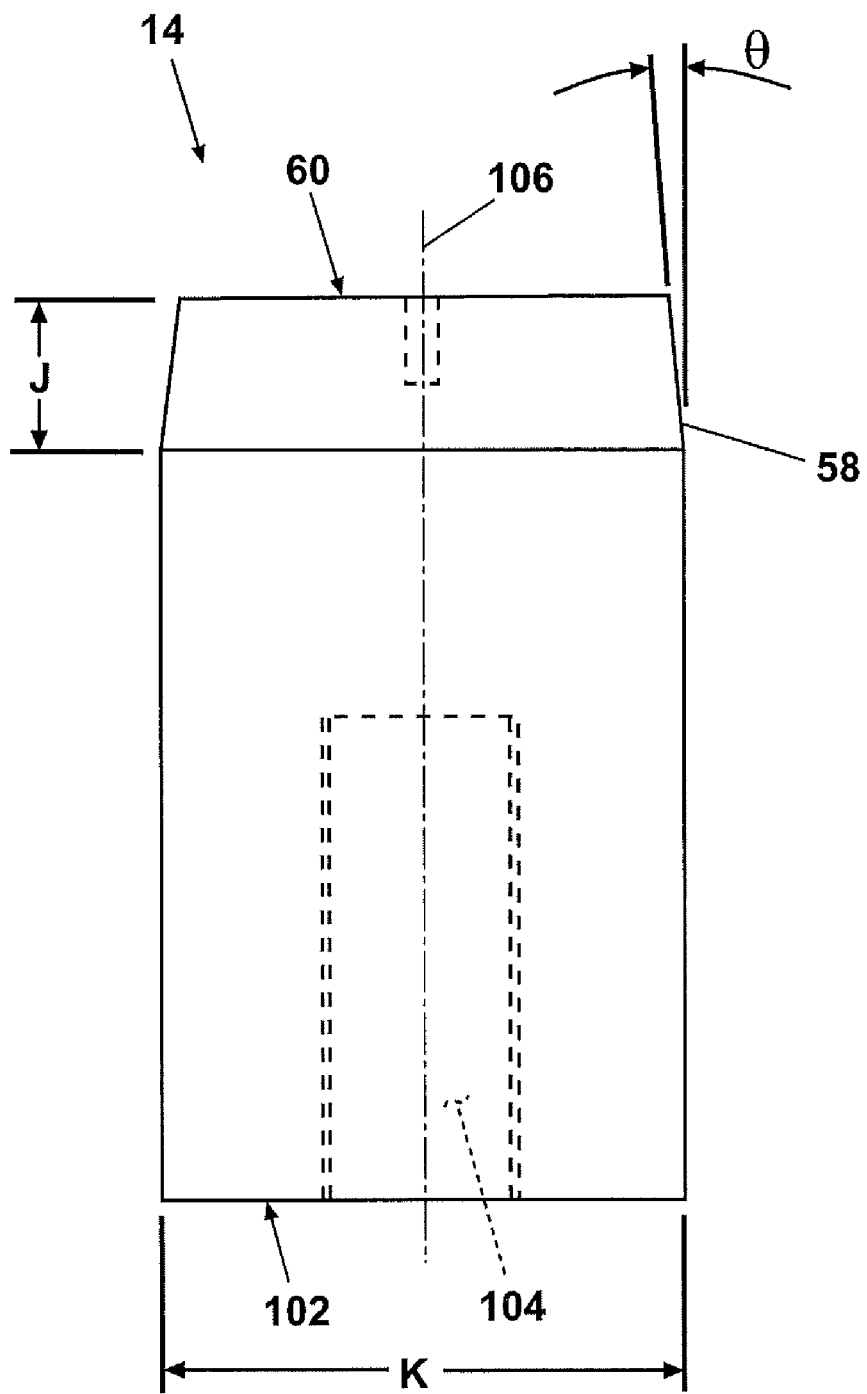
FIG. 7 is an elevational view of a latch pin of the present invention.

Referring generally to FIG. 7, latch pin 14 includes taper portion 58 which tapers outwardly from distal end 60 over a taper length "J". Taper portion 58 forms an angle θ over taper length "J". In a preferred embodiment of the present, angle θ is approximately 3.0°±0.4°. In another preferred embodiment of the present invention, angle θ can be any angle greater than 0° up to approximately 3.4°. In known applications, angle θ is approximately 4° or greater. By reducing angle θ to or below 3.4°, it has been found that a significant increase in the force required to overcome the energized position for latch pin 14 is provided. By reducing angle θ to or below 3.4°, force "S" required to open cockpit door 94 against an extended latch pin 14 is significantly increased and can exceed approximately 1500 pounds. This is sufficient to prevent an unauthorized manual opening of cockpit door 94.

As also seen in FIG. 7, latch pin 14 also includes an apertured end 102 which provides a threaded aperture 104 to threadably engage latch pin 14 with adjustment element 28. A pin diameter "K" is sized to provide a sliding or loose fit between latch pin 14 and pin receiving aperture 38 of catch/pin connecting member 36.

Referring again to FIG. 6, in another preferred embodiment of the present invention, a handle 108 is provided on the cockpit facing side only of cockpit door 94 and connected to latch bolt 82 to permit manual positioning in the engagement direction "P" or release direction "R" of latch bolt 82. This permits an operator within the cockpit area to manually latch or un-latch latch bolt 82 with respect to catch arm assembly 17. Latch bolt 82 can also be automatically positioned using an electronically controlled actuator (not shown).

Figure 8:
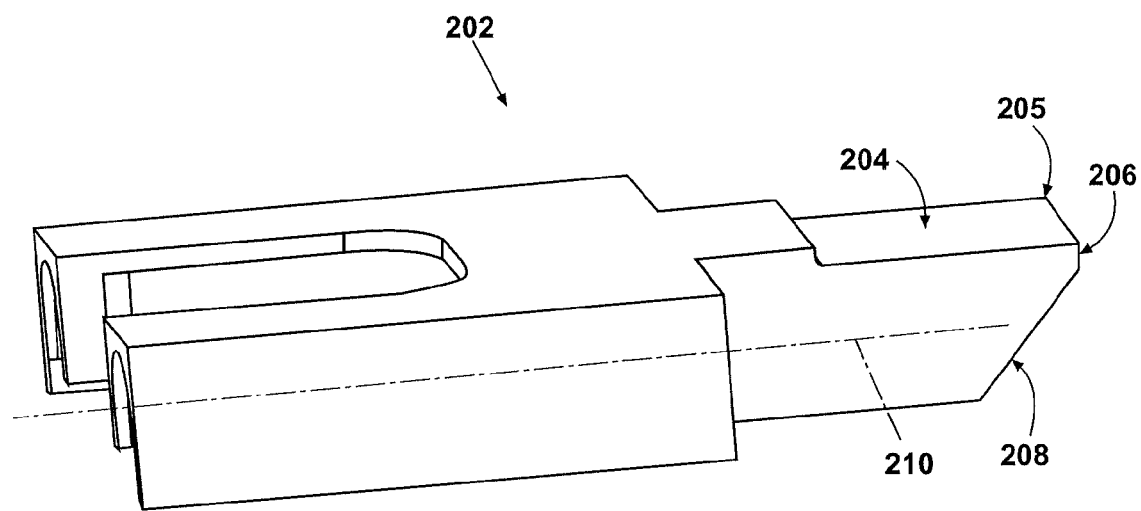
FIG. 8 is a perspective view of another embodiment of a latch bolt of the present invention.

Referring to FIG. 8 and again to FIG. 5, a latch bolt 202 is modified from latch bolt 82 by eliminating the bulbous end 90 of latch bolt 82 to create an entirely flat engagement surface 204. Latch bolt 202 also includes a sharp corner 205 at a free end of latch bolt 202, and a relief edge 206 also at a free end and connected with a tapered face 208. Engagement surface 204 is oriented parallel to a longitudinal axis 210 of latch bolt 202. The material removal area "F" of FIG. 5 provided between surface 88 and bulbous end 90 of latch bolt 82 is also shown in FIG. 8, however the material removal area can also be eliminated from the embodiment of FIG. 8 because the bulbous end 90 has been eliminated from this embodiment.

Figure 9:
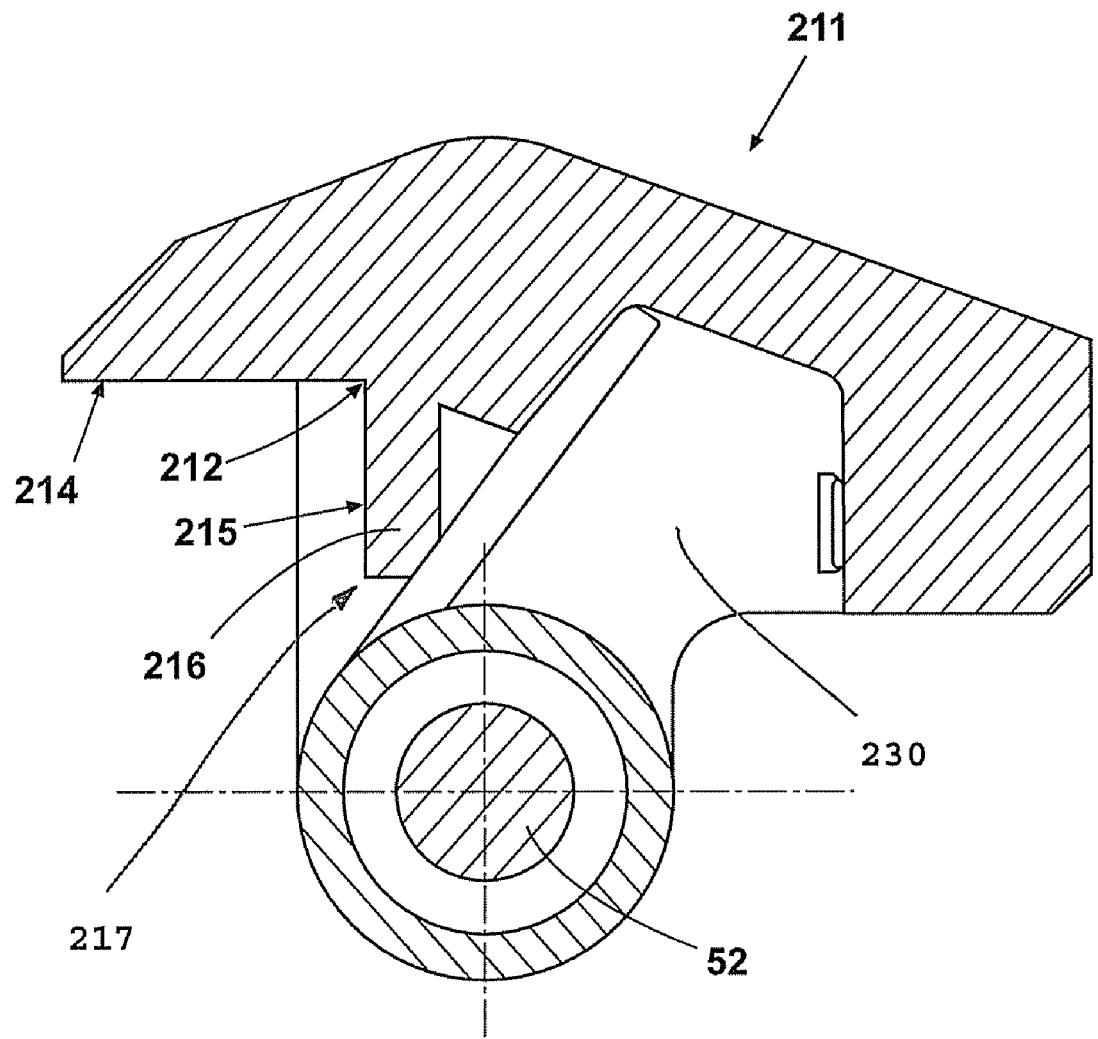
FIG. 9 is a cross sectional top plan view of another embodiment of a catch arm of the present invention.

Referring to FIG. 9, a catch arm 211 has been modified from catch arms 18 and 64. Only those items different from catch arms 18 and 64 will be further described. Catch arm 211 provides a right angle inner corner 212 that resides within a pocket 217. The pocket 217 is formed from the parallel arranged extensions 230 (only one of which is shown in FIG. 9), and a portion of flat face 214, so that the inner corner 212 resides within the pocket 217. Wall 216 is oriented 90 transverse to flat face 214. Catch arm 211, similar to catch arms 18 and 64, is rotatably supported on centering sleeve 52.

Figure 10:
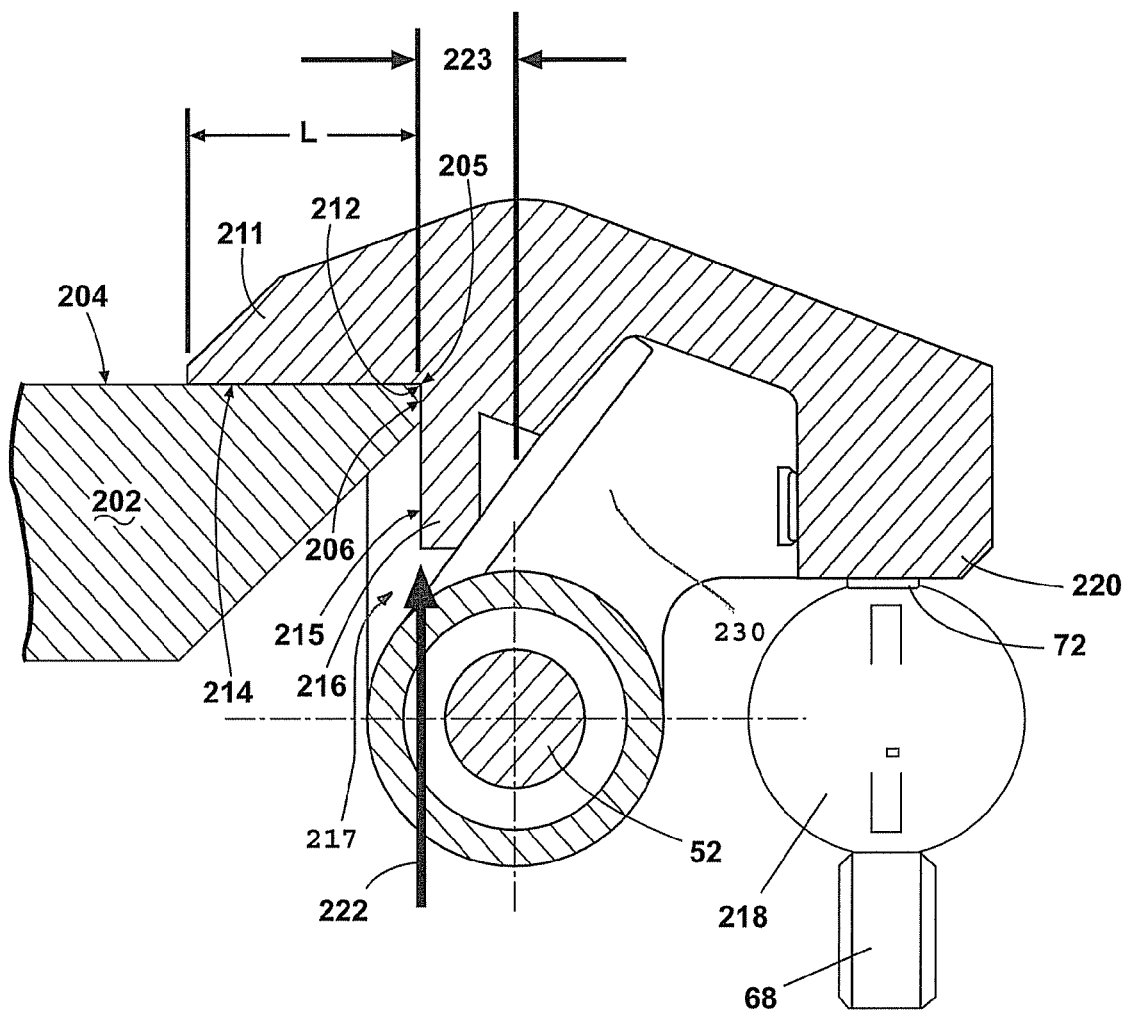
FIG. 10 is a cross sectional top plan view of further embodiment of a door locking mechanism of the present invention.

Referring now to FIG. 10, according to additional embodiments a mechanism 200 includes latch bolt 202 and catch arm 211 with catch arm rotatably supported on centering sleeve 52. A material of a latch pin 218 is modified from latch pin 14. Latch pin 218 is a 430C stainless steel selected to eliminate yield/deformation of latch pin 218 which can occur at the contact point between latch pin 218 and a pivot arm 220 of catch arm 211 if a softer material is used. A door closed and latched position is shown in FIG. 10 with latch bolt 202 in an extended position and planar contact resulting between engagement surface 204 of latch bolt 202 and face 215 of catch arm 211. Contact of flat face 214 with engagement surface 204 is provided for substantially an entire length "L" of flat face 214.

When the door is in the closed position represented by FIG. 10, the latch bolt 202 is positioned with the relief edge 206 abutting wall 215 such that sharp corner 205 is engaged with the corner 212 created at the junction between face 215 of wall 216 and flat face 214. This position provides a consistent extension of latch bolt 202 which also maintains a "face-to-face" contact between flat face 214 and engagement surface 204. The face-to-face contact with abutting wall 215 prevents over-engagement of catch arm 211 by latch bolt 202 which can result in a hooked condition. In a hooked condition the sharp corner 205 would be prevented from contacting flat face 214 and components of a force applied to the door in a force direction 222 will not be entirely oriented toward an opening direction of catch arm 211. The hooked condition can therefore create an elevated spike in the opening force required to force catch arm 211 to rotate back to the desired face-to-face contact position with engagement surface 204 before further rotating to clear catch arm 211. A spacing 223 from the center of centering sleeve 52 to face 215 and corner 212 in the door closed and latched position can be varied by the manufacturer to vary the moment arm and therefore the resistance to rotation of catch arm 211. As shown in FIG. 10, the relief edge 206 is positioned to lie over the spring 40 but laterally offset from a longitudinal centerline "C" of the centering sleeve 52, and more specifically between the longitudinal centerline C and an outer periphery of the spring 40.

Figure 11:
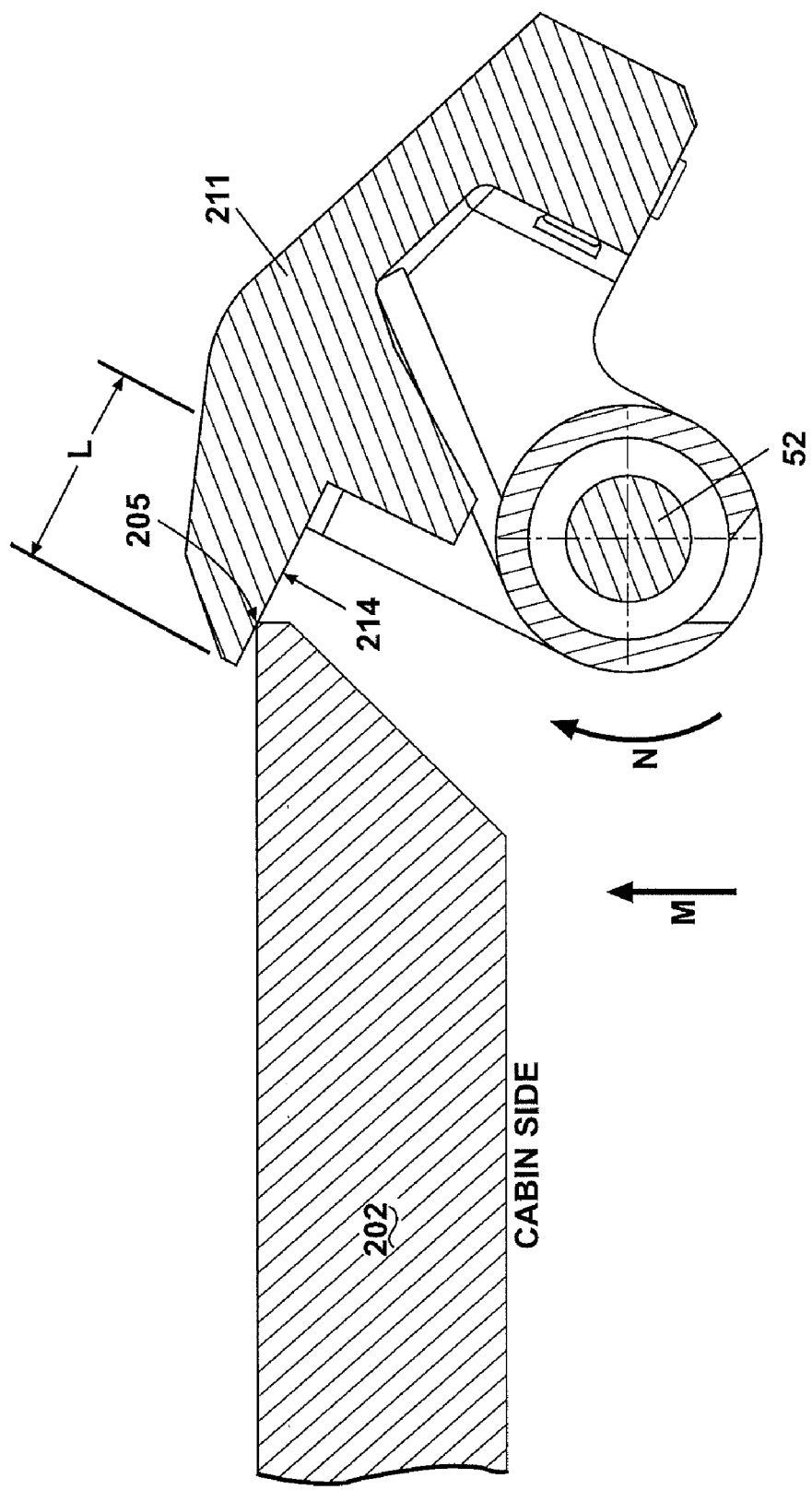
FIG. 11 is a cross sectional top plan view of the door locking mechanism of FIG. 10 in a rotated position of the catch arm.

Referring to FIG. 11, as an opening force "M" is applied from the cabin side, displacement of latch bolt 202 causes catch arm 211 to rotate in a clockwise direction "N" about centering sleeve 52 until flat face 214 rotates away from planar contact with engagement surface 204. This rotation creates a point load at the contact point between sharp corner 205 and flat face 214 which has a component of opening force always directed to rotate catch arm 211. This point load is thereafter evenly applied as sharp corner 205 slides along flat face 214 for length "L" as catch arm 211 continues to rotate.

An apparatus to reduce door opening force for an enhanced security flight deck door of the present invention provides several advantages. A bulbous or sharp end of a latch bolt effectively provides a point of contact with a face of a catch arm which multiplies the force as the catch arm rotates. The flattened face of the catch arm provides a smooth contact surface for the bulbous end as the door opens. A solenoid holds a latch pin in an extended solenoid energized position to normally keep the door in a closed, controlled position. By reducing a taper angle provided at an end of the latch pin below the commonly used taper angle of approximately 4 degrees or greater, significantly greater force must be applied to the door to force the catch arm to displace the latch pin. Using a door latch assembly of the present invention, the door is easier to open when the solenoid is de-energized and the latch pin is in the de-energized position. The door is significantly more difficult to force open when the latch pin is in the solenoid energized position due to the decreased latch pin taper angle.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An aircraft door latch mechanism, comprising:
   a latch bolt having a longitudinal axis, the latch bolt slidably positionable along the longitudinal axis between each of a retracted position and an extended position, the latch bolt also including a flat engagement surface, a sharp corner at a free end of the latch bolt proximate to the flat engagement surface, and a relief edge extending from the sharp corner, the sharp corner forming a 90 degree corner with the flat engagement surface;
   a latch pin including a taper portion having a taper angle ranging from an angle greater than zero degrees up to approximately 3.0 degrees with respect to a longitudinal axis of the latch pin, the latch pin positionable in each of a first extended position and a second retracted position; and
   a catch arm rotatably disposed on a pivot pin and adapted to engage the taper portion of the latch pin when the latch pin is positioned in the first extended position, the catch arm further including: a catch arm body; a first extension including a first aperture;
   a second extension including a second aperture, the second extension being spaced apart from the first extension and the first and second apertures being aligned;
   a torsion spring support tube extending between the first and second apertures;
   a torsion spring disposed on the torsion spring support tube, to provide a biasing force on the catch arm assembly;
   a centering sleeve extending through the first and second apertures, and through the torsion spring support tube, to enable rotation of the catch arm about a longitudinal centerline of the centering sleeve;
   a flat face; and
   a wall protruding transversally from the flat face and into a pocket formed on the catch arm, the wall having a face terminating in a free end, a 90 degree corner is defined between the face and the flat face;
   the pocket is formed by a portion of the catch arm body, the extensions and by a portion of the flat face so that the 90 degree corner resides within the pocket;

in the extended position the engagement surface of the latch bolt extends into the pocket and is in planar abutment with the flat face of the catch arm over an entire length of the flat face of the catch arm, the sharp corner is engaged with the corner of the catch arm, and the relief edge abuts the wall of the catch arm, and when the latch bolt is in the extended position and the relief edge is engaged with the corner of the catch arm, the relief edge is positioned to lie over the torsion spring and is laterally offset from a longitudinal centerline of the centering sleeve.

2. The aircraft door latch mechanism of claim 1, further comprising a solenoid, wherein the latch pin is connectable to the solenoid in parallel with the latch pin longitudinal axis, the solenoid being energizable to longitudinally displace the latch pin from the second retracted position to the first extended position.

3. The aircraft door latch mechanism of claim 2, further comprising:
   a support assembly adaptable to removably support the solenoid and rotatably support the catch assembly; and
   a connecting member connected to the support assembly, the connecting member including at least a bolt receiving aperture adapted to slidably receive the latch bolt and a contact face perpendicular to a longitudinal axis of the bolt receiving aperture;
   wherein the latch bolt is positioned in alignment with the contact face in the second retracted position.

4. The aircraft door latch mechanism of claim 3, wherein the first extended position comprises a solenoid energized condition.

5. The aircraft door latch mechanism of claim 3, wherein the second retracted position comprises a solenoid de-energized condition.

6. The aircraft door latch mechanism of claim 1, wherein the angle of the taper portion of the latch pin is selectable to permit a displacement of the catch arm in a direction substantially perpendicular to the longitudinal axis of the latch pin to displace the latch pin from the first extended position to the second retracted position upon application of a predetermined minimum force.

7. The aircraft door latch mechanism of claim 1, further comprising a wheel rotatably coupled to the catch arm and positioned to contact the taper portion of the latch pin to displace the latch pin toward the second retracted position.

8. The aircraft cockpit door mechanism of claim 7, wherein a material of the latch pin is 430C stainless steel to prevent yielding of the latch pin from contact with the wheel.

9. The aircraft door latch mechanism of claim 1, wherein the catch arm is rotatable about a catch arm rotation arc, the catch arm restrained at one end of a rotation path by contact between a stop portion of the catch arm and an adjustment screw threaded into engagement with a stop portion to provide a door closed position.

10. An aircraft cockpit door mechanism, comprising:
    a support assembly;
    a solenoid connected to the support assembly;
    a latch pin having a longitudinal axis, the latch pin connected to the solenoid substantially parallel to the latch pin longitudinal axis and operable to displace longitudinally along the longitudinal axis between each of a solenoid energized position and a solenoid de-energized position, the latch pin having a taper angle measurable from the longitudinal axis of the latch pin, and the taper angle ranging between an angle greater than zero degrees up to approximately 3.0 degrees with respect to the longitudinal axis of the latch pin;
    a catch assembly rotatably connectable to the support assembly and positionable to engage a taper portion of the latch pin when the latch pin is positioned in the solenoid energized position, the catch assembly including:
       a catch arm rotatably disposed on a torsion spring support tube and adapted to engage the taper portion of the latch pin when the latch pin is positioned in the solenoid energized position, the catch arm further including: a catch arm body; a pair of extensions; a flat face; a wall protruding transversely from the flat face and into a pocket formed in the catch arm, the wall having a face terminating in a free end, a 90 degree corner is defined between the face and the flat face; a torsion spring disposed around the torsion spring support tube centering sleeve; the pocket is formed by a portion of the flat face, a part of the catch arm body and the pair of extensions;
       a latch bolt slidably connected to a door and operable to rotate the catch assembly, the latch bolt including a flat engagement surface positionable in planar contact with the flat face of the catch arm wall over a full length of the flat face, to limit rotation of the catch arm, and a 90 degree corner at a free end of the latch bolt engaging the 90 degree corner of the catch arm in a latched position; and
    the 90 degree corner being positioned within the pocket.

11. The aircraft cockpit door mechanism of claim 10, further comprising a taper portion of the latch pin having a taper angle measurable from the longitudinal axis of the latch pin.

12. The aircraft cockpit door mechanism of claim 11, wherein the taper angle ranges between an angle greater than zero degrees up to approximately 3.0 degrees with respect to the longitudinal axis of the latch pin.

13. The aircraft cockpit door mechanism of claim 11, wherein the catch assembly is positionable to engage only the taper portion of the latch pin when the latch pin is positioned in the solenoid energized position.

14. The aircraft cockpit door mechanism of claim 13, wherein the taper angle of the latch pin is selectable to permit a displacement of the catch assembly in a direction substantially perpendicular to the longitudinal axis of the latch pin to displace the latch pin from the solenoid energized position to the solenoid de-energized position.

15. A method for controlling a position of an aircraft cockpit door, comprising:
    providing a door latch assembly having a rotatable catch and a latch pin;
    connecting the latch pin to a solenoid, the latch pin including a taper angle between about zero degrees and about three degrees;
    providing a latch bolt connectable to the cockpit door;
    providing a rotatable catch with a pocket that is formed by a pair of parallel extensions, a part of the catch body and a portion of a flat face forming a wall, the parallel extensions assisting in supporting the rotatable catch for rotational movement, providing the latch bolt with a flat engagement surface ending in a 90 degree corner, the rotatable catch having a wall protruding transversely from the flat face and into the pocket, the wall having a second face terminating at a free end, a 90 degree corner is defined between the flat face and the second face that is located within the pocket;
    disposing the rotatable catch on a torsion spring support tube;
    disposing a circumferential torsion spring on the torsion spring support tube;

positioning the latch bolt such that the 90 degree corner of the latch bolt contacts the flat face of the rotatable catch at the 90 degree corner of the rotatable catch, and with the flat engagement surface of the latch bolt in planar abutment with the flat face of the wall of the rotatable catch over an entire length of the flat face of the wall of the rotatable catch; and transmitting a door opening force through the door and via the door to the latch bolt such that in a solenoid de-energized position of the latch pin the 90 degree corner of the latch pin in contact with the flat face creates the door opening force as the cockpit door rotates away from a door closed position, and in a solenoid energized position of the latch pin the taper angle of the latch pin in contact with the rotatable catch prevents a manual displacement of the door from the door closed position.

16. The method of claim 15, further comprising creating a relief edge proximate a free end of the engagement surface of the latch bolt.

17. The method of claim 16, further comprising abutting the relief edge against the second wall of the catch arm when the 90 degree corner of the latch bolt is in contact with the 90 degree corner of the rotatable catch.

18. The method of claim 15, further comprising providing a taper angle one of less than and equal to 3.0 degrees for the tapered end of the latch pin.

19. The method of claim 15, further comprising energizing the solenoid to position the latch pin in the solenoid energized position.

20. The method of claim 15, further comprising de-energizing the solenoid to permit manually displacing the door.

21. The method of claim 19, further comprising selecting the taper angle to require a force greater than can be manually applied to the door to prevent displacement of the latch pin from the solenoid energized position.

* * * * *